(12) United States Patent
Park

(10) Patent No.: US 9,411,640 B2
(45) Date of Patent: Aug. 9, 2016

(54) METHOD FOR EFFICIENTLY MANAGING APPLICATION AND ELECTRONIC DEVICE IMPLEMENTING THE METHOD

(71) Applicant: Samsung Electronics Co., Ltd., Suwon-si, Gyeonggi-do (KR)

(72) Inventor: Sehee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/574,594

(22) Filed: Dec. 18, 2014

(65) Prior Publication Data

US 2015/0186179 A1    Jul. 2, 2015

(30) Foreign Application Priority Data

Jan. 2, 2014   (KR) .................. 10-2014-0000398

(51) Int. Cl.
*G06F 9/48*                (2006.01)

(52) U.S. Cl.
CPC .............. *G06F 9/485* (2013.01); *G06F 9/4881* (2013.01); *G06F 9/4843* (2013.01); *G06F 9/4887* (2013.01)

(58) Field of Classification Search
CPC ....... G06F 9/4881; G06F 9/4843; G06F 9/52; G06F 9/485
USPC ....................................................... 718/103
See application file for complete search history.

(56) References Cited

U.S. PATENT DOCUMENTS

| 5,867,735 | A * | 2/1999 | Zuravleff | G06F 9/3824 |
| | | | | 710/36 |
| 7,155,716 | B2 * | 12/2006 | Hooman | G06F 9/4881 |
| | | | | 711/100 |
| 7,996,846 | B2 * | 8/2011 | McCarthy | G06F 9/5011 |
| | | | | 709/223 |
| 9,110,790 | B1 * | 8/2015 | Joyce | G06F 12/0253 |
| 2002/0059347 | A1 * | 5/2002 | Shaffer | G06Q 10/107 |
| | | | | 715/210 |
| 2003/0172104 | A1 * | 9/2003 | Hooman | G06F 9/4881 |
| | | | | 718/103 |
| 2007/0067776 | A1 * | 3/2007 | McCarthy | G06F 9/5011 |
| | | | | 718/104 |
| 2013/0054929 | A1 | 2/2013 | Baik et al. | |
| 2013/0232573 | A1 | 9/2013 | Saidi et al. | |
| 2014/0325518 | A1 * | 10/2014 | Kim | G06F 9/5022 |
| | | | | 718/102 |

FOREIGN PATENT DOCUMENTS

KR   10-2013-0021625 A   3/2013

* cited by examiner

*Primary Examiner* — John Chavis
(74) *Attorney, Agent, or Firm* — Jefferson IP Law, LLP

(57) ABSTRACT

A method for managing an application is provided. The method includes executing a master application loaded into a first memory, executing a member application of the master application loaded into the first memory, and determining whether there is a shortage of an available space in the first memory, and changing if there is an available space shortage in the first memory, a priority of the master application, the master application not being closed in the first memory.

8 Claims, 7 Drawing Sheets

METHOD FOR EFFICIENTLY MANAGING APPLICATION AND ELECTRONIC DEVICE IMPLEMENTING THE METHOD

CROSS-REFERENCE TO RELATED APPLICATION(S)

This application claims the benefit under 35 U.S.C. §119(a) of a Korean patent application filed on Jan. 2, 2014 in the Korean Intellectual Property Office and assigned Serial number 10-2014-0000398, the entire disclosure of which is hereby incorporated by reference.

TECHNICAL FIELD

The present disclosure relates to a method for efficiently managing an application and an electronic device implementing the method.

BACKGROUND

With a remarkable growth of technologies, electronic devices have recently evolved into comprehensive multimedia players each of which has the ability to perform a great variety of functions such as a digital camera, a music player, a video player, a game console, a broadcast receiver, a navigation service, and the like.

When a particular function is performed through a related application, an electronic device stores therein various types of data associated with, required for, or created by the application. However, in some circumstances when performing two or more applications simultaneously, a shortage of a memory space may become more and more serious. This requires an efficient management of applications.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for efficiently managing an application and an electronic device implementing the method.

In accordance with an aspect of the present disclosure, a method for managing an application is provided. The method includes executing a master application loaded into a first memory, executing a member application of the master application loaded into the first memory, determining whether there is a shortage of an available space in the first memory, and changing, if there is an available space shortage in the first memory, a priority of the master application, the master application not being closed in the first memory.

In accordance with another aspect of the present disclosure, an electronic device is provided. The electronic device includes a first memory configured to load an application, a second memory configured to store therein the application and information about an application group, a display unit including a display module configured to display thereon one of an execution screen of the application, an application information screen, and a group manager screen, an input unit including a touch panel and a pen sensor and configured to recognize a user's selection on each screen, and a processor configured to execute a master application loaded into the first memory, to execute a member application of the master application loaded into the first memory, to determine whether there is a shortage of an available space in the first memory, and to change, if there is an available space shortage in the first memory, a priority of the master application, the master application not being closed in the first memory.

In accordance with another aspect of this the present disclosure, a non-transitory computer readable medium with a computer program recorded thereon is provided. The computer program when executed by a processor performs a method for managing an application, the method including executing a master application loaded into a first memory, executing a member application of the master application loaded into the first memory, determining whether there is a shortage of an available space in the first memory, and changing, if there is an available space shortage in the first memory, a priority of the master application, the master application not being closed in the first memory.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
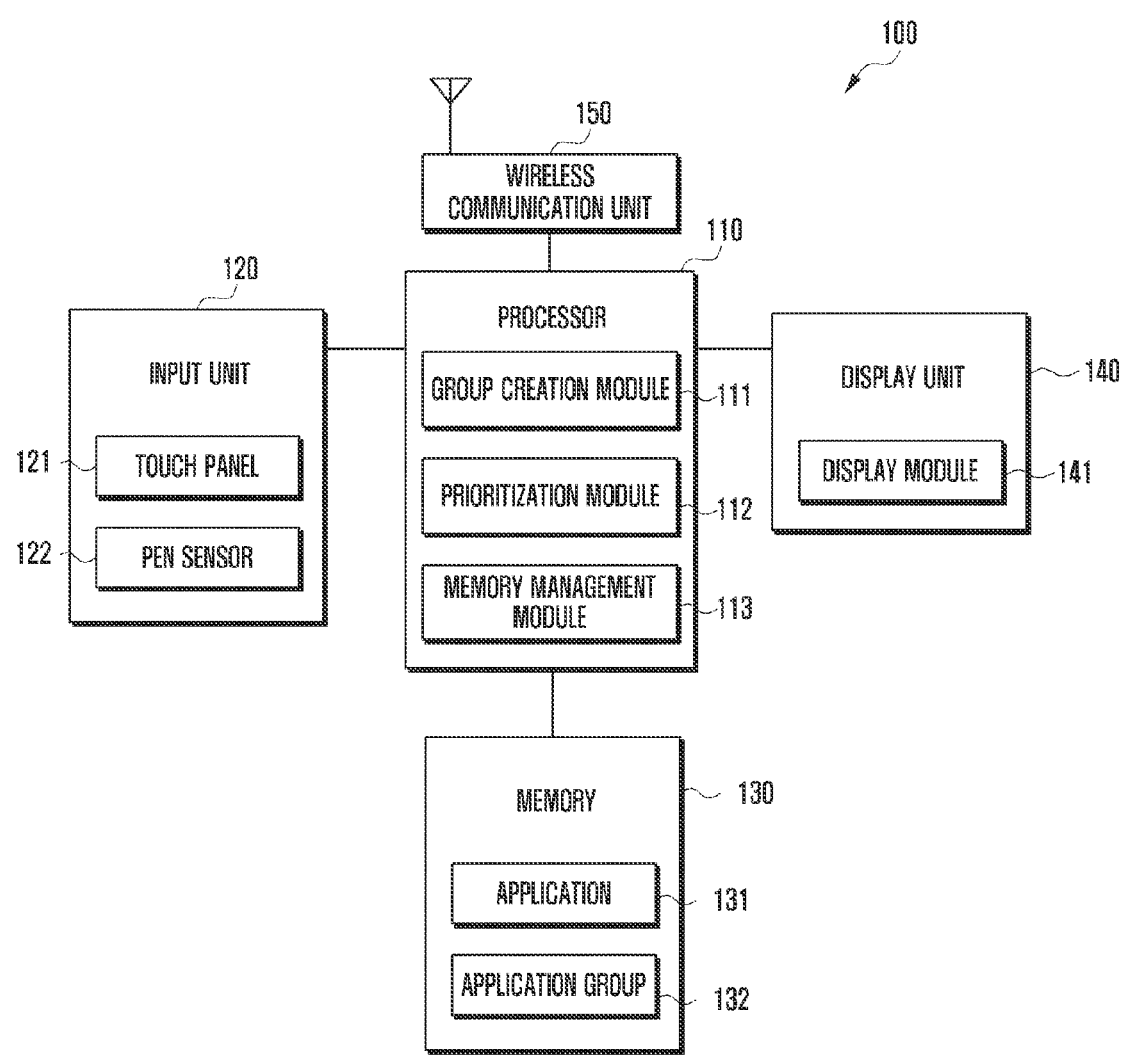
FIG. 1 is a block diagram illustrating an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the present disclosure may be a device including a communication function. For example, the device corresponds to a combination of at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer III (MP3) player, a mobile medical device, an electronic bracelet, an electronic necklace, an electronic appcessory, a camera, a wearable device, an electronic clock, a wrist watch, home appliances (for example, an air-conditioner, vacuum, an oven, a microwave, a washing machine, an air cleaner, and the like), an artificial intelligence robot, a Television (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, and the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for ship (for example, navigation equipment for ship, gyrocompass, and the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to a person skilled in the art that the electronic device according to the present disclosure is not limited to the above-mentioned devices.

A foreground process refers to a process of executing a specific application having higher priority when two or more applications are executed at the same time in a single electronic device. The application having higher priority refers to a certain application which occupies the electronic device and is interactively used by a user, namely, an application located in front from the point of view of a user. Meanwhile, a background process refers to a process of executing invisibly a specific function behind any foreground application without linkage with a user.

Additionally, an application group may include a master application and a member application. Further, a list of grouped applications and information about relation between applications may be included. A master application is defined by a processor of the electronic device. The processor may define, as a master application, a specific application selected by a user or selected according to frequency of use in applications. A member application is also defined by the processor of the electronic device. The processor may define a certain application as a member application of the master application by recognizing a request of the master application to install any other application or by recognizing a user's selection of any other application. The processor of the electronic device may create an application group by grouping the master application and one or more member applications thereof.

FIG. 1 is a block diagram illustrating an electronic device according to various embodiments of the present disclosure.

Referring to FIG. 1, the electronic device 100 may include, but not limited to, a processor 110, an input unit 120, a memory 130, a display unit 140, and a wireless communication unit 150, but is not limited thereto.

The processor 110 receives commands from the described other component elements through, for example, a bus, decrypts the received commands, and executes operations or data processes based on the decrypted commands.

The processor 110 may include a group creation module 111, a prioritization module 112, and a memory management module 113. The group creation module 111 may create a group of applications. Additionally, the group creation module 111 may define a master from among grouped applications and define the others as member applications. The group creation module 111 may define a specific application, selected by a user, as a master application. Alternatively, the group creation module 111 may define the most frequently used application as a master application. Further, the group creation module 111 may define a certain application as a member application of the master application by recognizing a request of the master application to install any other application or by recognizing a user's selection of any other application.

The prioritization module 112 may perform a task for changing priorities of currently executed applications when a notification that there is a shortage of an available space in the first memory is received. Here, priority may indicate the order of executing applications. Additionally, when executed applications are required to be closed depending on an available space in the first memory, the prioritization module 112 may close later an application having higher priority. For example, the processor 110 of the electronic device 100 may be executing a master application and member applications. Also, the master application and the member application belonging to the same group may have to be executed, as exchanging data with each other, at least one of them being not closed. In this case, the prioritization module 112 may receive, from the memory management module 113, a notification that there is a shortage of an available space in the first memory. The prioritization module 112 may change priority of the master application to the highest priority in a corresponding group such that an application in the same group may not be closed.

The memory management module 113 may check an available space in the first memory. If it is determined that there is a shortage of an available space in the first memory, the memory management module 113 may send a notification of a shortage of an available space to the prioritization module 112. On receipt of this notification, the prioritization module 112 may change priorities of member applications being executed in the background process.

The input unit 120 may include a touch panel 121 and a pen sensor 122. The input unit 120 may deliver a command or data, entered by a user through the touch panel 121 or the pen sensor 122, to the processor 110, the memory 130, and/or the wireless communication unit 150. For example, the input unit 120 may offer data of a user's touch, entered through the touch panel 121, to the processor 110.

The touch panel 121 recognizes a touch input based on, for example, at least one of a capacitive type, a resistive type, an infrared type, and an ultrasonic type. The touch panel 121 may further include a controller. When a touch input is the capacitive type, an indirect touch may be recognized, in addition to a direct touch. The term "direct touch scheme" refers to a scheme in which a conductive object (for example, a finger or a stylus pen) is directly in contact with a touch screen. The term "indirect touch scheme" may refer to a scheme in which a conductive object enclosed by a non-conductive object (for example, a finger of a hand with a glove on it) approaches a touch screen, or a non-conductive object (for example, a glove in which fingers are included) is in contact with a touch screen. The term "indirect touch scheme" may also refer to a scheme in which a finger touches a non-conductive object when the non-conductive object (for example, a cover for protecting a touch screen) is placed on the touch screen and is in contact with the touch screen. The term "indirect touch scheme" may further refer to a scheme commonly called "hovering", in which a finger is not in contact with a touch screen, and approaches the touch screen within a predetermined distance so as to generate an event. The touch panel 121 may further include a tactile layer, and provide a user with a tactile reaction. The touch panel 121 may be installed in a screen (that is, a touch screen) of the display module 141. For example, the touch panel 121 may be embodied as an add-on type indicating that a touch panel is positioned on a touch screen, or as an on-cell type or in-cell type indicating that a touch panel is inserted into the display module 141.

The (digital) pen sensor 122 is embodied, for example, using a method identical or similar to a method of receiving a touch input of a user, or using a separate recognition sheet. The memory 130 stores commands or data that may be received from the processor 120 or other component elements, or may be generated by the processor 120 or other component elements. The memory 130 may store therein an application 131 and an application group 132. According to various embodiments, the application 131 may include a Short Message Service (SMS)/Multimedia Messaging Service (MMS) application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 131 may be an application associated with an exchange of information between the electronic device 100 and any external electronic device. This type application may include a notification relay application for delivering specific information to an external electronic device, or a device management application for managing such an external electronic device.

For example, the notification relay application may include a function to deliver notification information created at any other application of the electronic device 100 to an external electronic device. Additionally or alternatively, the notification relay application may receive notification information from an external electronic device and offer the notification information to a user. The device management application may manage (e.g., install, remove or update) a certain function (a turn-on/turn-off of an external electronic device (or some components thereof), or an adjustment of brightness (or resolution) of a display) of any external electronic device that communicates with the electronic device 100, a certain application that operates at the external electronic device, or a certain service (e.g., a call service or a message service) offered by the external electronic device.

According to various embodiments, the application 131 may include a specific application specified depending on attributes of the external electronic device. For example, in case any external electronic device is an MP3 player, the application may include a specific application associated with a play of music. Similarly, in case any external electronic device is a portable medical device, the application may include a specific application associated with a health care. In an embodiment, the application may include at least one of an application assigned to the electronic device or an application received from an external electronic device.

Additionally, the application 131 may be defined as a master application or a member application. The application group 132 may include a master application and a member application. The processor 110 of the electronic device 120 may create the application group 132 by grouping a master application and one or more member applications. The processor 110 may define the application 131 as a master application according to a user's selection, frequency of a user's selection, priority, or the like. Also, the processor 110 may define the application 131 as a member application, belonging to the same group as that of a master application, by recognizing a request of the master application or by recognizing a user's selection. The application group 132 may further include a list of grouped applications and information about relation between applications 131.

The memory 130 may include an internal memory and an external memory. The internal memory may be classified into the first memory and the second memory. The first memory of the memory 130 may be a volatile memory (e.g., Dynamic Random Access Memory (DRAM), Static RAM (SRAM), Synchronous DRAM (SDRAM), etc.). For example, an application may be loaded onto the first memory of the memory 130 and then executed. When the supply of electric power is stopped, information may disappear from this volatile memory. The second memory may be a nonvolatile memory (e.g., One Time Programmable Read-Only Memory (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.). For example, the second memory may offer a space in which applications or data downloaded via the wireless communication unit by a user or other application are installed.

The internal memory may be in a form of a Solid State Drive (SSD). The external memory may further include a flash driver, for example, a Compact Flash (CF), a Secure Digital (SD), a Micro Secure Digital (Micro-SD), a Mini Secure Digital (Mini-SD), an eXtreme Digital (xD), or a MemoryStick.

The display unit 140 includes a display module 141. The display module 141 includes a panel. The panel may be, for example, a Liquid-Crystal Display (LCD) or an Active-Matrix Organic Light-Emitting Diode (AM-OLED). The panel may be embodied to be, for example, flexible, transparent, or wearable. The panel may be configured to be an integrated module with the touch panel 121. The hologram shows a three-dimensional image in the air using interference of light. According to an embodiment, the display module 141 may further include a control circuit for controlling the panel or the hologram.

The wireless communication unit 150 connects communication between another electronic device and the electronic device 100. The wireless communication unit 150 may support a predetermined short range communication protocol (for example, wireless fidelity (WiFi), bluetooth (BT), near field communication (NFC)) or predetermined network communication (for example, the Internet, a Local Area Network (LAN), a wide area network (WAN), a telecommunication network, a cellular network, a satellite network, a Plain Old Telephone Service (POTS), and the like). The other electronic device may be a device identical to the electronic device 100, or may be a different device (for example, a different type of device).

The term "module" may refer to, for example, a unit including one of hardware, software, and firmware, or a combination of at least two of them. The term "module" may be interchangeable with the terms, such as a "unit", a "logic", a "logical block", a "component", a "circuit", and the like. A module may be a basal unit or a portion of an integrated component. A module may be a basal unit or a portion that executes one or more functions. A module may be mechanically or electrically embodied. For example, a module may include at least one of an Application-Specific Integrated Circuit (ASIC) chip, Field-Programmable Gate Arrays (FPGAs) or a programmable-logic device, which may execute operations that have been known or operations to be developed.

Figure 2:
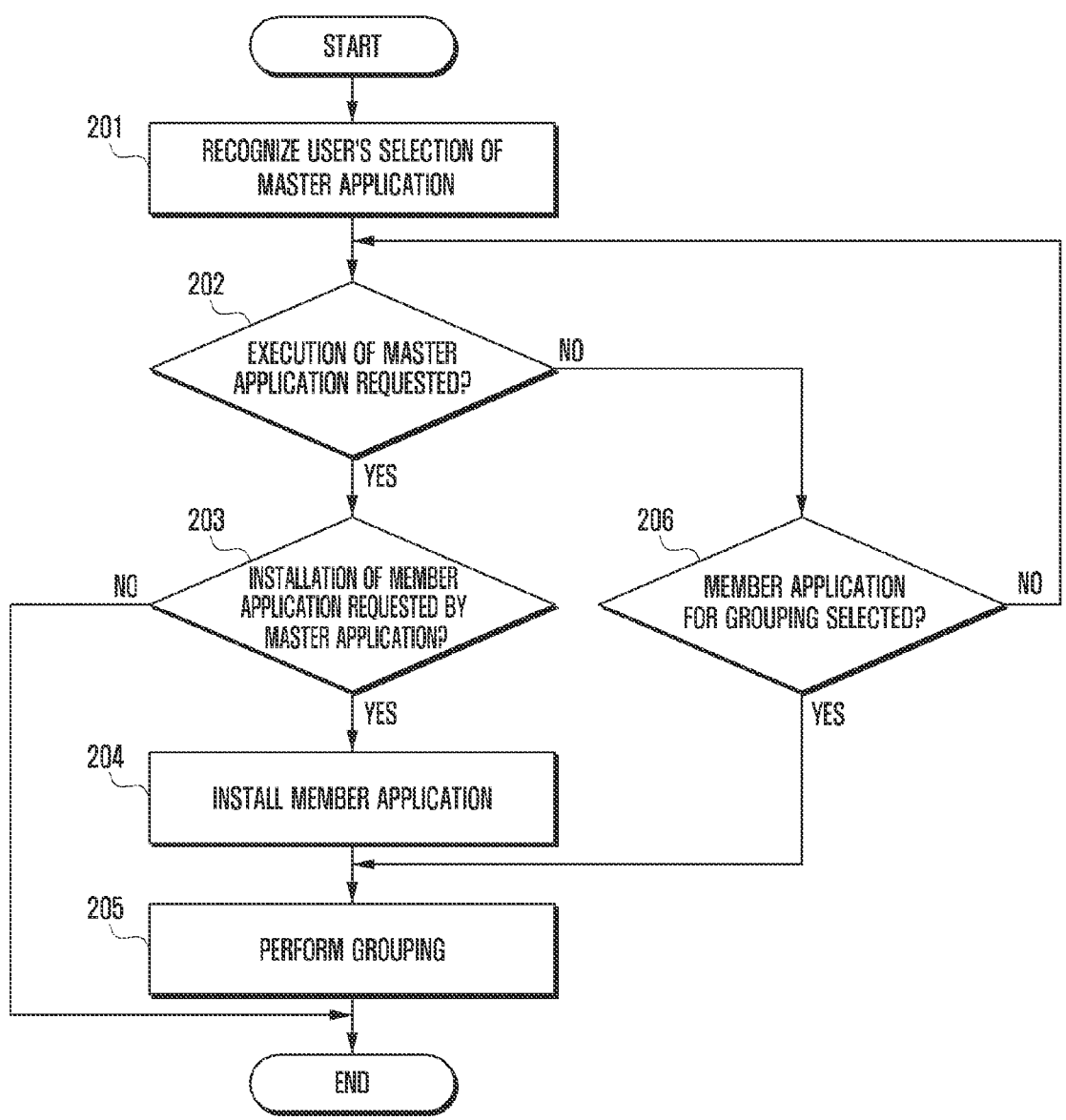
FIG. 2 is a flow diagram illustrating an application grouping process in an electronic device according to various embodiments of the present disclosure.

FIG. 2 is a flow diagram illustrating an application grouping process in an electronic device according to various embodiments of the present disclosure.

Referring to FIG. 2, at operation 201, the processor 110 of the electronic device 100 may recognize a user's selection of a master application. At operation 202, the processor 110 may determine whether any user's request for execution of the master application is recognized. If no request for executing the master application is recognized, the processor 110 may recognize at operation 206 a user's selection of a member application to be grouped. If a user's request for executing the master application is successfully recognized at operation 202, the processor 110 may determine at operation 203 whether a request of the master application to install a member application is recognized. If no request for installing a member application is recognized from the master application, the process may be ended. If a request for installing a member application is successfully recognized from the master application at operation 203, the processor 110 may install at operation 204 a selected member application in the second memory of the memory 130. Namely, the processor 110 may store a selected member application in the second memory of the memory 130. At operation 205, the processor 110 may perform a grouping of the member application selected at operation 203 or 206. Further, the processor 110 may store, in the application group 132, a list of grouped applications and information about relation between applications. When a notification that there is a shortage of an available space in the first memory of the memory 130 is received, the processor 110 may define priorities by checking the list in the application group 132 of the memory 130.

Figure 3:
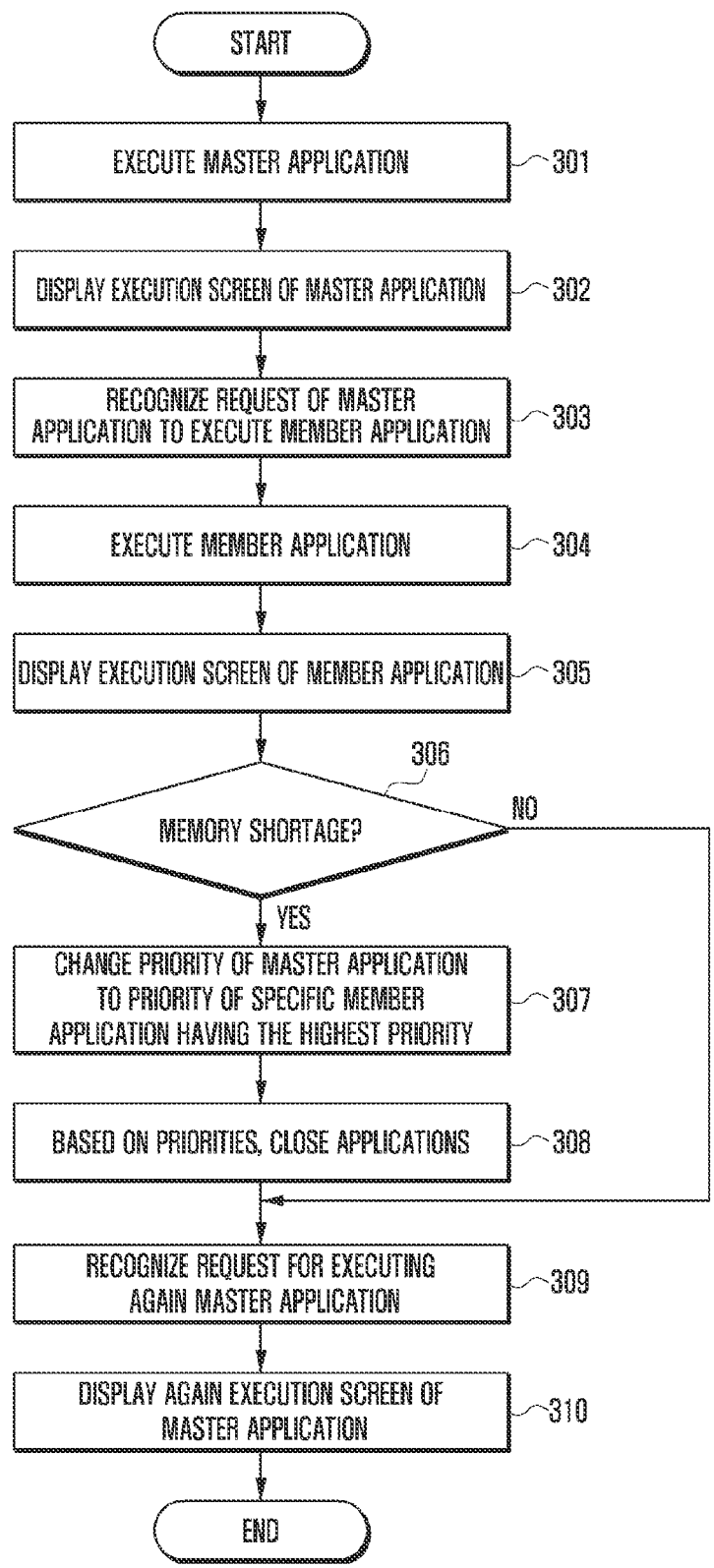
FIG. 3 is a flow diagram illustrating a method for managing an application in an electronic device according to various embodiments of the present disclosure.

FIG. 3 is a flow diagram illustrating a method for managing an application in an electronic device according to various embodiments of the present disclosure.

Referring to FIG. 3, at operation 301, the processor 110 may execute a master application by recognizing a user's request for execution of a master application. At operation 302, the processor 110 may control the display module 141 to display thereon an execution screen of the master application which is being executed in the foreground process. Additionally, the processor 110 may recognize at operation 303 a request of the master application to execute a member application, and execute at operation 304 the requested member application. This request for executing the member application may be received from a user. The member application may operate in the foreground process, and thereby the master application may operate in the background process. At operation 305, the processor 110 may control the display module 141 to display thereon an execution screen of the member application. At operation 306, the processor 110 may determine whether there is a shortage of an available space in the first memory of the memory 130. If there is no shortage of an available space in the first memory, the processor 110 may recognize at operation 309 a user's request or a request of the member application to execute again the master application. At operation 310, the processor 110 may execute again the master application, being executed in the background process, in the foreground process and also control the display module 141 to display again the execution screen of the master application.

If the memory management module 113 of the processor 110 determines at operation 306 that there is a shortage of an available space in the first memory of the memory 130, the processor 110 may close any application being executed in the background process. Before closing applications, the processor 110 may change at operation 307 priority of the master application to priority of a specific member application having the highest priority among the member applications being executed in the background process. Namely, priority of the master application may become equal to that of the member application having the highest priority. At operation 308, based on priorities, the processor 110 may selectively and sequentially close the applications, being executed in the background process, in order to secure an available space in the first memory of the memory 130. At operation 308, the master application the priority of which is changed at operation 307 may be not closed. At operation 309, the processor 110 may recognize a user's request or a request of the member application to execute again the master application. At operation 310, the processor 110 may execute again the master application, being executed in the background process, in the foreground process and also control the display module 141 to display again the execution screen of the master application.

Figure 4A:
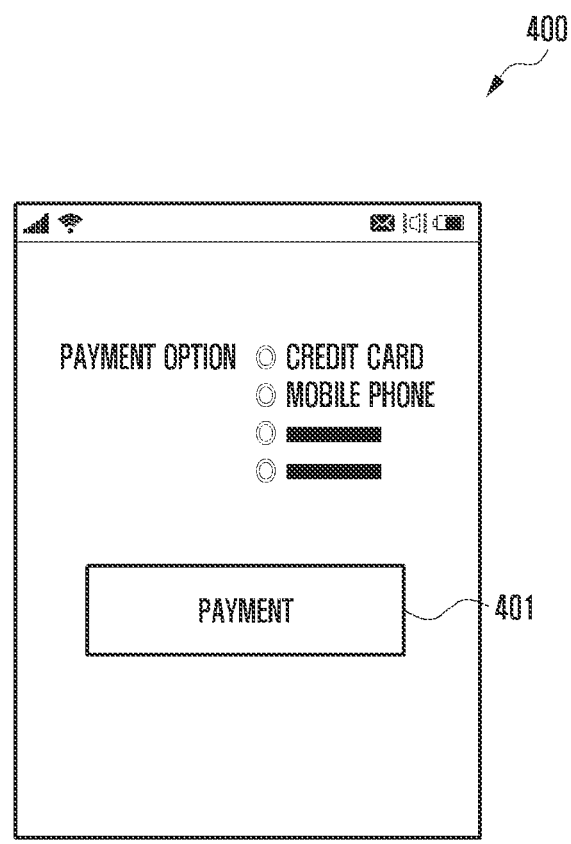
FIGS. 4A and 4B are screenshots illustrating an application grouping process in an electronic device according to an embodiment of the present disclosure.
Figure 4B:
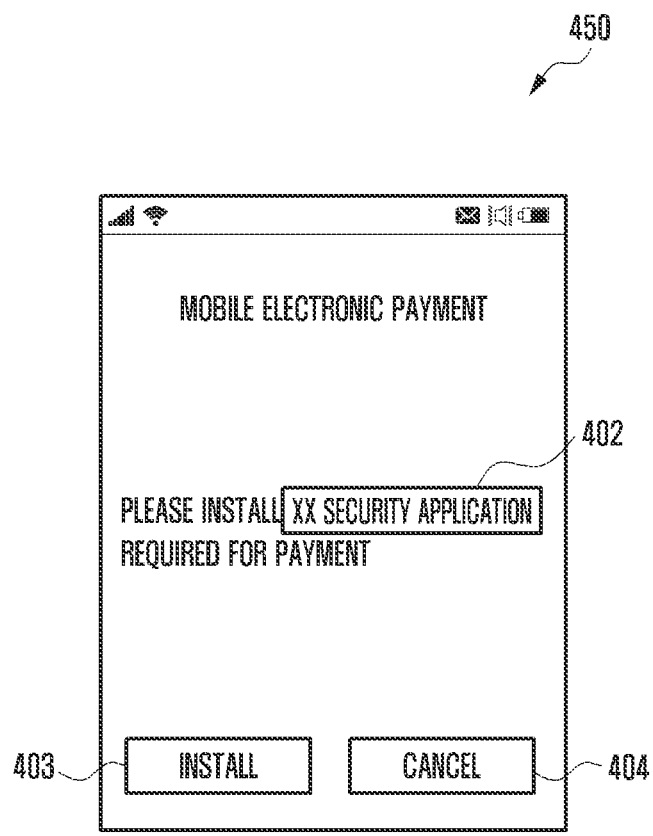

FIGS. 4A and 4B are screenshots illustrating an application grouping process in an electronic device according to an embodiment of the present disclosure.

Referring to FIG. 4A, a certain application for payment is illustrated. The processor 110 may control to the display module 141 to display thereon an execution screen 400 of a payment application which is a master application. The payment application may visually offer a payment button 401 to a user. When a user selects the payment button 401, the processor 110 may control the display module 141 to display thereon an installation request screen.

Referring to FIG. 4B, when the payment button 401 is selected in FIG. 4A, the processor 110 may recognize a request of the master application (i.e., the payment application) to install a member application (e.g., a security application 402), and control the display module 141 to display an installation request screen 450. If a user selects an install button 403 on the installation request screen 450, the processor 110 may install the security application 402 in the second memory of the memory 130. Further, the group creation module 111 of the processor 110 may create a group of the payment application (i.e., the master application) and the security application 402 (i.e., the member application).

Figure 5A:
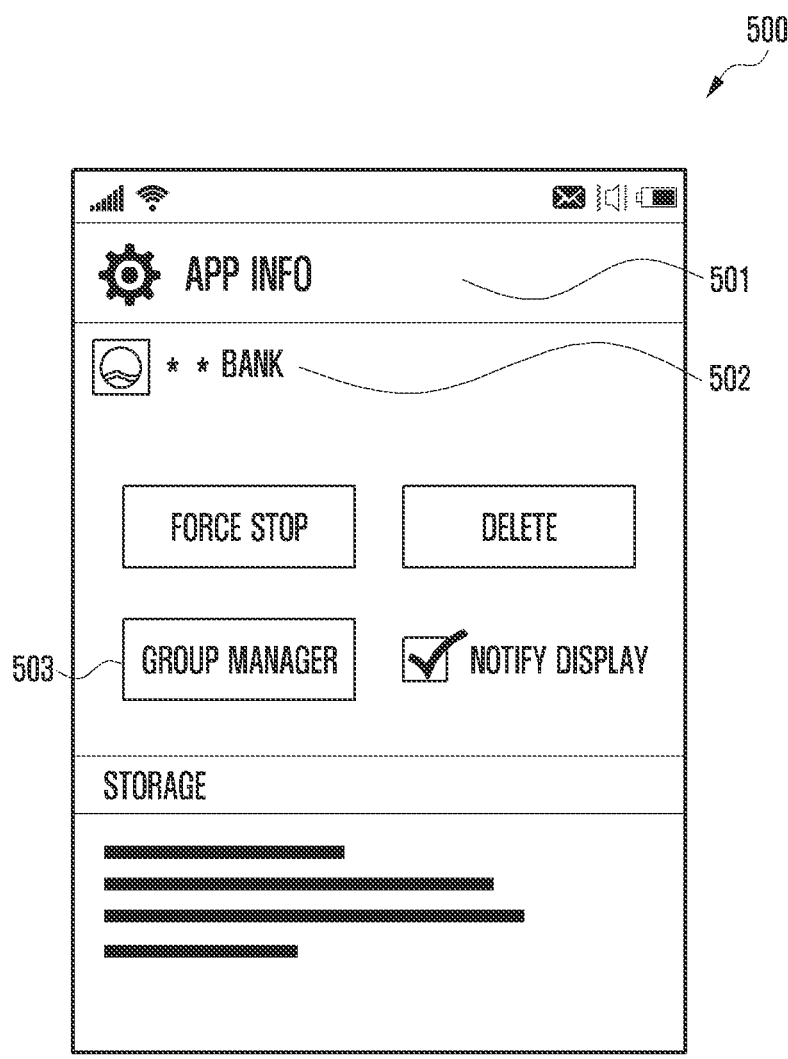
FIGS. 5A and 5B are screenshots illustrating an application grouping process in an electronic device according to another embodiment of the present disclosure.
Figure 5B:
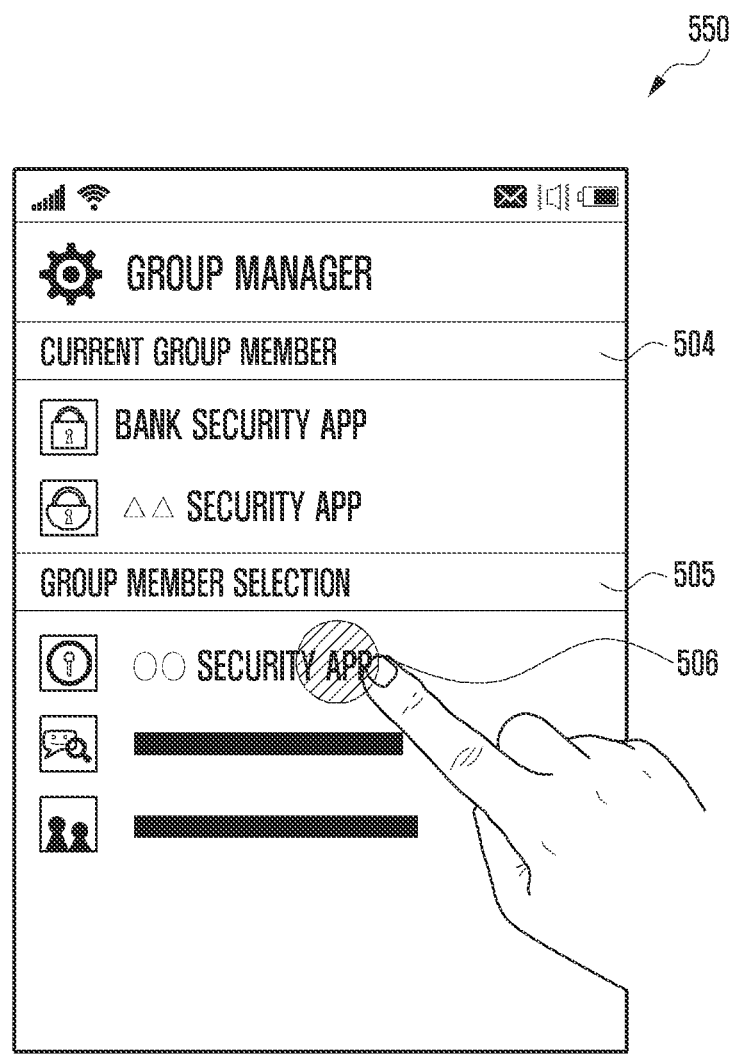

FIGS. 5A and 5B are screenshots illustrating an application grouping process in an electronic device according to another embodiment of the present disclosure.

Referring to FIG. 5A a screen of application information is illustrated. The processor 110 may transmit a display command signal to the display module 141 to display an application information screen 500 of a certain bank application (denoted by AA Bank 502). The display module 141 may receive the display command signal and display thereon the application information screen 500 which contains, for example, a force stop button, a delete button, and a group manager button 503. If a user selects the group manager button 503 on the application information screen 500, the processor 110 may control the display module 141 to display thereon a group manager screen Referring to FIG. 5B, a group manager screen 550 may contain a current group member section 504 in which all of member and/or master applications grouped with the current application (e.g., AA bank application) are displayed. Also, the group manager screen 550 may contain a group member selection section 505 which offers a grouping environment to a user. If a user selects a certain application 506 in the group member selection section 505, the processor 110 may add the selected application 506 to member applications of the current master application (e.g., AA bank application). The group manager screen 550 is shown exemplarily only and not to be considered as a limitation. Additionally, based on frequency of use in applications, the processor 110 may define a master application from among applications grouped by a user's selection.

As discussed hereinbefore, grouping of applications allows an efficient use of memory in any environment where two or more applications are simultaneously executed.

The method according to the disclosure as described above may be implemented as a program command which may be executed through various computers and recorded in a computer-readable recording medium. Further, the program instructions may be specially designed and constructed, but may be well known and used by those skilled in the art of computer software. Further, the storage medium may include a hardware device such as a hard disk, a floppy disk, a magnetic media such as a magnetic tape, an optical media such as a Compact Disc ROM (CD-ROM) and DVD, a magneto-optical media such as a floptical disk, a ROM, a RAM, and a flash memory. In addition, the program instructions may include high class language codes, which are executed in a computer by using an interpreter, as well as machine codes which are made by a compiler.

While the present disclosure has been shown and described with reference to various embodiments therefore, it will be understood by those skilled in the art that various changes in form and details may be made therein without departing from the spirit and scope of the present disclosure as defined by the appended claims and their equivalents.

What is claimed is:

1. A method for managing an application, the method comprising:
   grouping a master application and at least one member application;
   executing by loading the master application into a first memory;
   executing by loading the at least one member application into the first memory in a foreground and executing the master application in a background, when detecting a request for execution of the at least one member application;
   determining whether there is a shortage of an available space in the first memory; and
   changing, if there is an available space shortage in the first memory, a priority of the master application to a priority of a member application having a highest priority, the master application not being closed in the first memory.

2. The method of claim 1, further comprising:
   installing a specific application in a second memory; and
   adding the installed specific application to the member application of the master application.

3. The method of claim 2, wherein the adding of the installed specific application is performed when a request of the master application to install at least one application is recognized.

4. The method of claim 1, wherein the master application is one of determined by a user of an electronic device and determined as a most used application among all applications of the electronic device.

5. An electronic device comprising:
   a first memory configured to load an application;
   a second memory configured to store therein the application and information about an application group;
   a display unit including a display module configured to display thereon one of an execution screen of the application, an application information screen, and a group manager screen;
   an input unit including a touch panel and a pen sensor and configured to recognize a user's selection on each screen; and
   a processor configured:
      to group a master application and at least one member application,
      to execute by loading the master application into the first memory,
      to execute by loading the at least one member application into the first memory in a foreground and execute the master application in a background, when detect a request for execution of the at least one member application,
      to determine whether there is a shortage of an available space in the first memory, and
      to change, if there is an available space shortage in the first memory, a priority of the master application to a priority of a member application having a highest priority, the master application not being closed in the first memory.

6. The electronic device of claim 5, wherein the processor is further configured:
   to install a specific application in the second memory, and
   to add the installed specific application to the member application of the master application.

7. The electronic device of claim 6, wherein the processor is further configured to add the installed specific application when a request of the master application to install at least one application is recognized.

8. The electronic device of claim 5, wherein the master application is one of determined by a user of an electronic device and determined as a most used application among all applications of the electronic device.

* * * * *